(12) United States Patent
Kawase (10) Patent No.: US 10,974,767 B2
(45) Date of Patent: Apr. 13, 2021

(54) VEHICLE SIDE PORTION STRUCTURE

(71) Applicant: Toyota Jidosha Kabushiki Kaisha, Toyota (JP)

(72) Inventor: Kyosuke Kawase, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 105 days.

(21) Appl. No.: 16/527,765

(22) Filed: Jul. 31, 2019

(65) Prior Publication Data
US 2020/0062311 A1 Feb. 27, 2020

(30) Foreign Application Priority Data

Aug. 22, 2018 (JP) .............................. JP2018-155515

(51) Int. Cl.
*B62D 21/15* (2006.01)
*B60K 1/04* (2019.01)
*B62D 25/20* (2006.01)
*B62D 29/00* (2006.01)
(52) U.S. Cl.
CPC .............. *B62D 21/157* (2013.01); *B60K 1/04* (2013.01); *B62D 25/2036* (2013.01); *B62D 29/008* (2013.01); *B60K 2001/0438* (2013.01); *B60Y 2306/01* (2013.01)
(58) Field of Classification Search
CPC ......................... B62D 21/157; B62D 25/2036; B62D 29/008; B62D 25/025; B62D 21/152; B62D 25/20; B60K 1/04; B60K 2001/0438; B60Y 2306/01
See application file for complete search history.

(56) References Cited

U.S. PATENT DOCUMENTS

| | | | | |
|---|---|---|---|---|
| 9,505,442 B2* | 11/2016 | Wu | ........................ | B60K 1/04 |
| 9,809,101 B2* | 11/2017 | Ikeda | ................. | B62D 25/2036 |
| 10,752,292 B2* | 8/2020 | Kawase | ................. | B62D 21/02 |
| 10,843,545 B2* | 11/2020 | Grace | ..................... | B60L 50/66 |
| 2012/0161472 A1* | 6/2012 | Rawlinson | ............. | B60R 16/04 |
| | | | | 296/187.08 |
| 2013/0088045 A1* | 4/2013 | Charbonneau | ....... | B62D 21/157 |
| | | | | 296/187.12 |
| 2018/0148106 A1 | 5/2018 | Ayukawa | | |
| 2019/0248418 A1* | 8/2019 | Sono | .................... | B62D 21/157 |

FOREIGN PATENT DOCUMENTS

| | | |
|---|---|---|
| JP | 2008-174181 A | 7/2008 |
| JP | 2010-100207 A | 5/2010 |
| JP | 2018-090021 A | 6/2018 |

* cited by examiner

*Primary Examiner* — Pinel E Romain
(74) *Attorney, Agent, or Firm* — Dinsmore & Shohl LLP (57) ABSTRACT

Joining members 56 are provided that permit a rocker lower 22 moving toward a vehicle outer side at least along a direction of input of side collision load F when, at a time of a side collision of a vehicle 10, side collision load F' that is greater than or equal to a set load that is set in advance is inputted to a rocker 16. Namely, in a case in which the side collision load F' that is greater than or equal to the set load is transmitted from a battery pack 20 to the rocker 16, the rocker lower 22 moves toward the vehicle outer side. Therefore, reaction force that the battery pack 20 receives from the rocker 16 is reduced, and collision load that is inputted to the battery pack 20 side is decreased.

6 Claims, 8 Drawing Sheets

VEHICLE SIDE PORTION STRUCTURE

CROSS-REFERENCE TO RELATED APPLICATION

This application is based on and claims priority under 35 USC 119 from Japanese Patent Application No. 2018-155515 filed on Aug. 22, 2018, the disclosure of which is incorporated by reference herein.

BACKGROUND

Technical Field

The present disclosure relates to a vehicle side portion structure.

Related Art

Japanese Patent Application Laid-Open (JP-A) No. 2008-174181 (Patent Document 1) discloses, in a vehicle body (a vehicle) in which a battery is installed at the lower side of a floor panel, a technique of efficiently absorbing side collision load that is inputted to a side still (hereinafter called "rocker" and effectively protecting the battery.

To briefly describe this related art, the vehicle transverse direction both end portions of a cross member, which is provided along the vehicle transverse direction on the floor panel, are extended, and closed cross-sectional structural portions are formed between the rockers and the battery. At the time of a side collision of the vehicle, due to the closed cross-sectional structural portion being crushed, the impact energy that is due to the side collision load inputted to the rocker is absorbed, deformation of the battery tray in which the battery is accommodated is suppressed, and the battery is protected.

Further, Japanese Patent Application Laid-Open (JP-A) No. 2010-100207 (Patent Document 2) discloses a technique of dispersing side collision load and protecting a battery unit by moving the battery unit toward the vehicle vertical direction upper side at the time of a side collision of the vehicle.

By the way, generally, in cases in which the battery is made large, the battery space in the vehicle transverse direction becomes large. Namely, the gaps between the battery and the rockers become narrow. Therefore, in a case in which the battery is made to be large in vehicles to which the above-described related art are applied, if a collision object such as a pole side-collides locally with the rocker from the vehicle transverse direction outer side, there is the possibility that a stroke that is sufficient to absorb the collision energy will not be ensured.

Accordingly, in the above-described related art, there is room for further improvement in protecting the battery.

SUMMARY

In view of the above-described circumstances, an object of the present disclosure is to provide a vehicle side portion structure that can protect a battery even in the case of a side collision with a collision object such as a pole.

A vehicle side portion structure relating to a first aspect of the present disclosure has: a pair of rockers that are respectively disposed at both vehicle transverse direction outer sides of a floor panel of a vehicle, and that extend along a vehicle longitudinal direction; a battery that is disposed between the pair of rockers at a vehicle vertical direction lower side of the floor panel, and that supplies electric power to a motor that is installed in the vehicle; and movement permitting portions that, when, at a time of a side collision of the vehicle, a collision load that is greater than or equal to a set load that is set in advance is inputted to a second rocker positioned at a side opposite from a first rocker, which is positioned at a side collision side among the pair of rockers, permit movement of the second rocker toward a vehicle outer side at least along a direction of input of the collision load.

In the vehicle side portion structure relating to the present disclosure of the first aspect, the pair of rockers extend along the vehicle longitudinal direction at the vehicle transverse direction both outer sides of the floor panel of the vehicle, respectively. Further, the battery is disposed between the pair of rockers at the vehicle vertical direction lower side of the floor panel. Electric power can be supplied by the battery to the motor for running that is installed in the vehicle.

Here, the present disclosure is provided with the movement permitting portions that, at the time of a side collision of the vehicle, permit movement of the second rocker, which is positioned at the side opposite the first rocker that is positioned at the side collision side among the pair of rockers, toward the vehicle outer side at least along the direction of input of the collision load.

To describe this briefly, when collision load (side collision load) that is greater than or equal to a set load that is set in advance is inputted (transmitted) to the second rocker at the time of a side collision of the vehicle, the second rocker can, owing to the movement permitting members, move toward the vehicle outer side at least along the direction of input of the collision load.

For example, if collision load is inputted to the first rocker at the time of a side collision of the vehicle, at least a portion of that collision load is transmitted from the first rocker to the battery and the second rocker. Therefore, in the present disclosure, at the time of a side collision of the vehicle, in the case of a side collision with a collision object such as a pole, or the like, when collision load that is greater than or equal to the set load is inputted (transmitted) to the second rocker, the second rocker moves toward the vehicle outer side due to the movement permitting members, at least along the direction of input of the collision load.

Namely, in a case in which collision load that is greater than or equal to the set load is inputted to the battery and the second rocker, because the second rocker moves toward the vehicle outer side, the reaction force that the battery receives from the second rocker is reduced (is dodged by the second rocker), and the collision load that is inputted to the battery side is reduced. Due thereto, in the present disclosure, the battery can be protected even in the case of a side collision with a collision object such as a pole or the like.

Note that "a set load that is set in advance" here means the load at which the second rocker starts to move along the direction of input of the collision load. Further, "the second rocker moves at least along the direction of input of the collision load" is, for example, a case in which the second rocker moves along the direction of input of the collision load by extending or the like, which includes movement or plastic deformation or the like, due to the movement permitting portions. Further, in addition to these, such movement also includes cases in which, after the second rocker moves along the direction of input of the collision load due to plastic deformation or the like of the movement permitting portions, the second rocker comes apart toward the lower side in the vehicle vertical direction due to the movement permitting portions breaking.

In a vehicle side portion structure relating to a second aspect of the present disclosure, the movement permitting portions are provided further toward a vehicle vertical direction upper side than the battery as seen in a vehicle side view.

For example, in a case in which the movement permitting portions are provided at positions overlapping the battery as seen in a vehicle side view, the movement permitting portions are provided between the rockers and the battery along the vehicle transverse direction, and the width dimension, along the vehicle transverse direction, at the battery becomes shorter by an amount corresponding to the provision of these movement permitting portions. Namely, the volume of the battery becomes smaller by that much. Similarly, in a case in which the movement permitting portions are provided at the vehicle vertical direction lower side of the battery as seen in a vehicle side view, the height dimension, along the vehicle vertical direction, at the battery becomes shorter by that much.

Therefore, in the vehicle side portion structure relating to the present disclosure of the second aspect, the movement permitting portions are provided further toward the vehicle vertical direction upper side than the battery as seen in a vehicle side view. The floor panel is provided at the vehicle vertical direction upper side of the battery, and, generally, a gap for cooling the battery is provided between the floor panel and the battery. By providing the movement permitting portions at the vehicle vertical direction upper side of the battery by utilizing this gap, there is no need to make the volume of the battery small in order to provide the movement permitting portions, and the volume of the battery can be ensured even if the movement permitting portions are provided.

A vehicle side portion structure relating to a third aspect of the present disclosure further has: closed cross-sectional portions that are provided within the rockers; and impact absorbing portions that are disposed within the closed cross-sectional portions at positions overlapping the battery as seen in a vehicle side view, that span between outer side walls that are provided at vehicle transverse direction outer sides at the rockers and inner side walls that are provided at vehicle transverse direction inner sides at the rockers, and that deform due to input of the collision load and absorb collision energy.

In the vehicle side portion structure relating to the third aspect, the closed cross-sectional portions are provided within the rockers, and the impact absorbing portions are disposed within the closed cross-sectional portions at positions that overlap the battery as seen in a vehicle side view. The impact absorbing portions span between the outer side walls, which are provided at the vehicle transverse direction outer sides at the rockers, and the inner side walls, which are provided at the vehicle transverse direction inner sides at the rockers, and are set so as to deform due to input of collision load (side collision load) and absorb collision energy.

Generally, the rigidity of the battery that is installed in the vehicle is set to be high in order to suppress deformation of the battery itself. Therefore, due to the impact absorbing portions being disposed at positions overlapping the battery as seen in a vehicle side view, a portion of the collision load that is inputted to the rocker at the time of a side collision of the vehicle is transmitted to the battery side via the impact absorbing portion.

As described above, because the rigidity of the battery is set to be high, when collision load is inputted to the battery, reaction force is obtained from the battery. Due thereto, the impact absorbing portion plastically deforms, and impact energy is absorbed. Namely, by providing the impact absorbing portions, the amount of impact energy that is absorbed can be improved, and the collision load can be reduced even if there is a short stroke.

In a vehicle side portion structure relating to a fourth aspect of the present disclosure, the rockers are structured to include rocker uppers that structure upper portions of the rockers and rocker lowers that structure lower portions of the rockers, and the movement permitting portions are joined portions that join the rocker uppers and the rocker lowers, and that break when a collision load that is greater than or equal to the set load is inputted to the movement permitting portions.

In the vehicle side portion structure relating to the fourth aspect, the rockers are structured to include the rocker uppers that structure the upper portions of the rockers, and the rocker lowers that structure the lower portions of the rockers. The movement permitting portions are joined portions that join the rocker uppers and the rocker lowers, and are set so as to break when collision load that is greater than or equal to the set load is applied to those movement permitting portions. Note that "joined portions" here also includes joining by welding or the like, in addition to joining by fastening by bolts or rivets or the like.

In the vehicle side portion structure relating to the fourth aspect, when collision load is inputted to the first rocker at the time of a side collision of the vehicle, a portion of the collision load is transmitted to the battery and the second rocker. When a portion of the collision load is transmitted to the battery and the second rocker in this way, the second rocker is pushed, via the battery, toward the vehicle outer side along the direction of input of the collision load. Due thereto, the joined portions extend (deform), and the rocker lower moves together with the battery toward the vehicle outer side. Further, when the joined portions break, the joined state of the rocker upper and the rocker lower is cancelled, and the rocker upper and the rocker lower separate. Due thereto, the rocker lower of the second rocker, together with the battery, comes apart toward the vehicle vertical direction lower side.

Due to the above-described structure, in the present disclosure, the reaction force that the battery receives from the second rocker is reduced, and, as a result, the collision load that is inputted to the battery side at the time of a side collision of the vehicle is reduced.

In a vehicle side portion structure relating to a fifth aspect of the present disclosure, the joined portions at which the rocker uppers and the rocker lowers are joined are structured to include: upper side outer side walls that are provided at vehicle transverse direction outer sides at the rocker uppers; lower side outer side walls that are provided at vehicle transverse direction outer sides at the rocker lowers, and that are disposed at vehicle transverse direction outer sides of the upper side outer side walls; upper side inner side walls that are provided at vehicle transverse direction inner sides at the rocker uppers; and lower side inner side walls that are provided at vehicle transverse direction inner sides at the rocker lowers, and that are disposed at vehicle transverse direction outer sides of the upper side inner side walls.

In the vehicle side portion structure relating to the fifth aspect, at the joined portion where the rocker upper and the rocker lower are joined, the lower side outer side wall is disposed at the vehicle transverse direction outer side of the upper side outer side wall, and the lower side inner side wall is disposed at the vehicle transverse direction outer side of the upper side inner side wall. When collision load is inputted to the first rocker at the time of a side collision of the vehicle, at the first rocker, this collision load is transmitted from the lower side outer side wall to the upper side outer side wall, and this collision load is transmitted from the lower side inner side wall to the upper side inner side wall. Then, when a portion of the collision load is transmitted from this first rocker to the battery and the second rocker, at the second rocker, this collision load is transmitted from the upper side inner side wall to the lower side inner side wall, and this collision load is transmitted from the upper side outer side wall to the lower side outer side wall.

For example, as a comparative example, a case is considered in which, at the second rocker side, the lower side inner side wall is disposed at the vehicle transverse direction inner side of the upper side inner side wall, and the lower side outer side wall is disposed at the vehicle transverse direction inner side of the upper side outer side wall. In this structure, the upper side inner side wall and the upper side outer side wall extend at the vehicle outer sides of the lower side inner side wall and the lower side outer side wall of the rocker lower, respectively. Therefore, in a case in which collision load is inputted to the second rocker and the second rocker starts to move along the direction of input of the collision load, movement of the rocker lower is impeded by this upper side inner side wall and upper side outer side wall.

In contrast, in the present disclosure, the lower side inner side wall is disposed at the vehicle transverse direction outer side of the upper side inner side wall, and the lower side outer side wall is disposed at the vehicle transverse direction outer side of the upper side outer side wall. In this structure, the upper side inner side wall and the upper side outer side wall do not exist at the vehicle outer sides of the lower side inner side wall and the lower side outer side wall of the rocker lower. Therefore, in a case in which the second rocker starts to move along the direction of input of the collision load at the time of a side collision of the vehicle, it can be made such that movement of the rocker lower is not impeded by this upper side inner side wall and upper side outer side wall.

In a vehicle side portion structure relating to a sixth aspect of the present disclosure, the rockers are structured to include rocker uppers that structure upper portions of the rockers and rocker lowers that structure lower portions of the rockers, and the movement permitting portions include: engaging portions that are provided at the rocker uppers, and engaged-with portions that are provided at the rocker lowers, and that are engaged with the engaging portions so as to be able to move relative thereto, the engaging portions moving along a vehicle transverse direction when a collision load that is greater than or equal to the set load is inputted to the movement permitting portions.

In the vehicle side portion structure relating to the sixth aspect, the rockers are structured to include the rocker uppers that structure the upper portions of the rockers, and the rocker lowers that structure the lower portions of the rockers. Further, the movement permitting portions are structured to include the engaging portions that are provided at the rocker uppers, and the engaged-with portions that are provided at the rocker lowers. The engaged-with portions are engaged with the engaging portions so as to be able to move relative thereto. When collision load that is greater than or equal to the set load is inputted to these movement permitting portions, the engaging portions start to move relatively along the vehicle transverse direction.

Namely, the present disclosure is an example in which the second rocker moves due to movement of the movement permitting portions. An example is a case in which the "engaging portions" are pins, and the "engaged-with portions" are long holes that are formed along the vehicle transverse direction.

As described above, the vehicle side portion structure relating to the first aspect has the effect that the battery can be protected even in the case of a side collision with a collision object such as a pole.

The vehicle side portion structure relating to the second aspect has the effect that the volume of the battery can be ensured even if the movement permitting portions are provided.

The vehicle side portion structure relating to the third aspect has the effects that the amount of collision energy that is absorbed can be improved, and the collision load can be reduced even if there is a short stroke.

The vehicle side portion structure relating to the fourth aspect has the effect that the collision load that is inputted to the battery side can be reduced at the time of a side collision of the vehicle.

The vehicle side portion structure relating to the fifth aspect has the effect that it can be made such that movement of the second rocker is not impeded at the time of a side collision of the vehicle.

The vehicle side portion structure relating to the sixth aspect has the effect that, at the time of a side collision of the vehicle, the second rocker can be moved by movement that is due to the movement permitting portions.

BRIEF DESCRIPTION OF THE DRAWINGS

Exemplary embodiments of the present disclosure will be described in detail based on the following figures, wherein.

DETAILED DESCRIPTION

A vehicle side portion structure relating to an embodiment of the present disclosure is described on the basis of the drawings. Note that arrow FR, arrow UP and arrow OUT that are shown appropriately in the respective drawings indicate the forward direction, the upward direction and the outward direction, respectively, of a vehicle to which the vehicle side portion structure relating to the embodiment of the present disclosure is applied. Hereinafter, when description is given by merely using longitudinal, vertical and left-right directions, they refer to the longitudinal of the vehicle longitudinal direction, the vertical of the vehicle vertical direction, and the left and right when facing in the forward direction, unless otherwise indicated.

<Structure of Vehicle Side Portion Structure>

Figure 1:
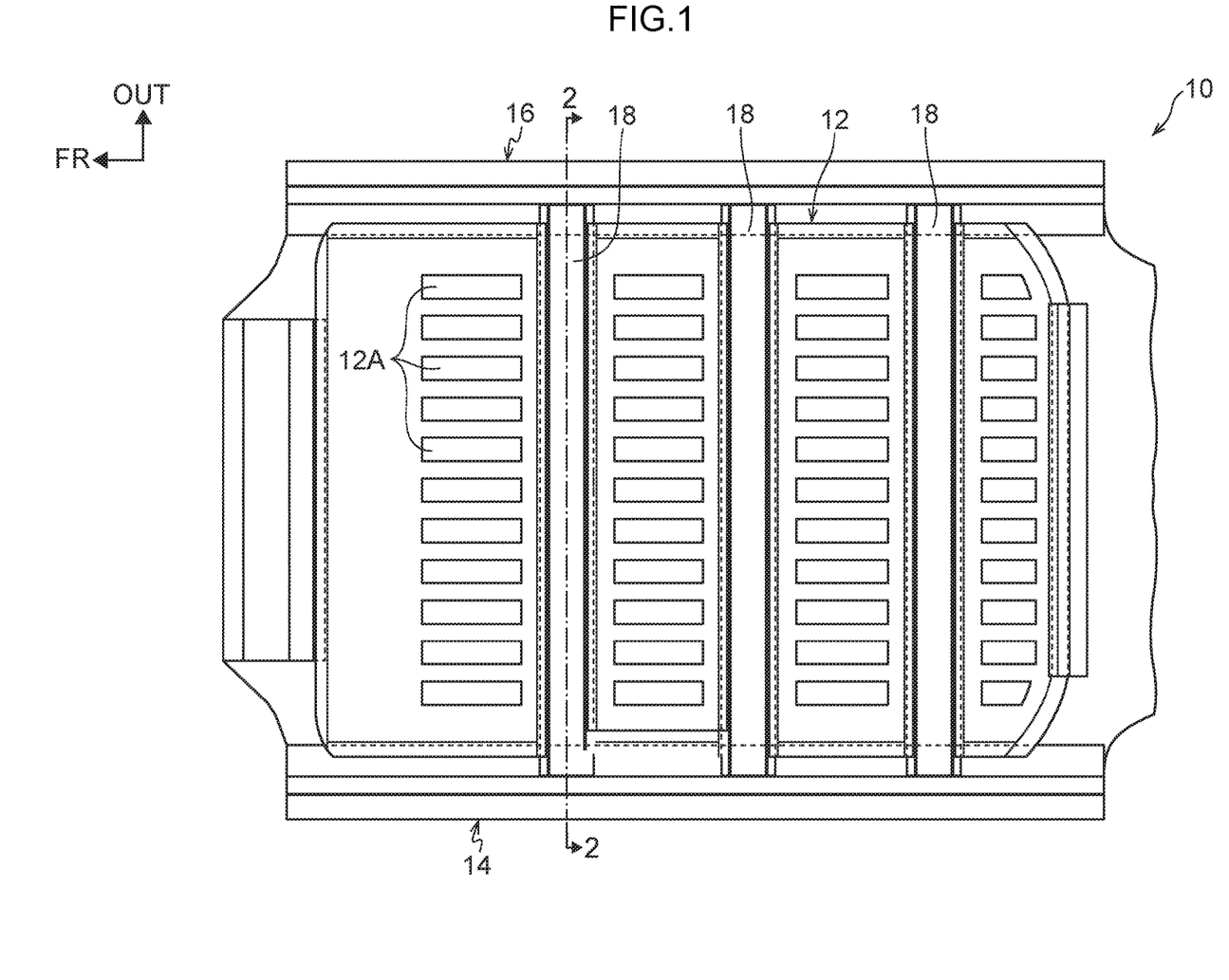
FIG. 1 is a plan view of a vehicle lower portion to which a vehicle side portion structure relating to a present embodiment is applied.
Figure 2:
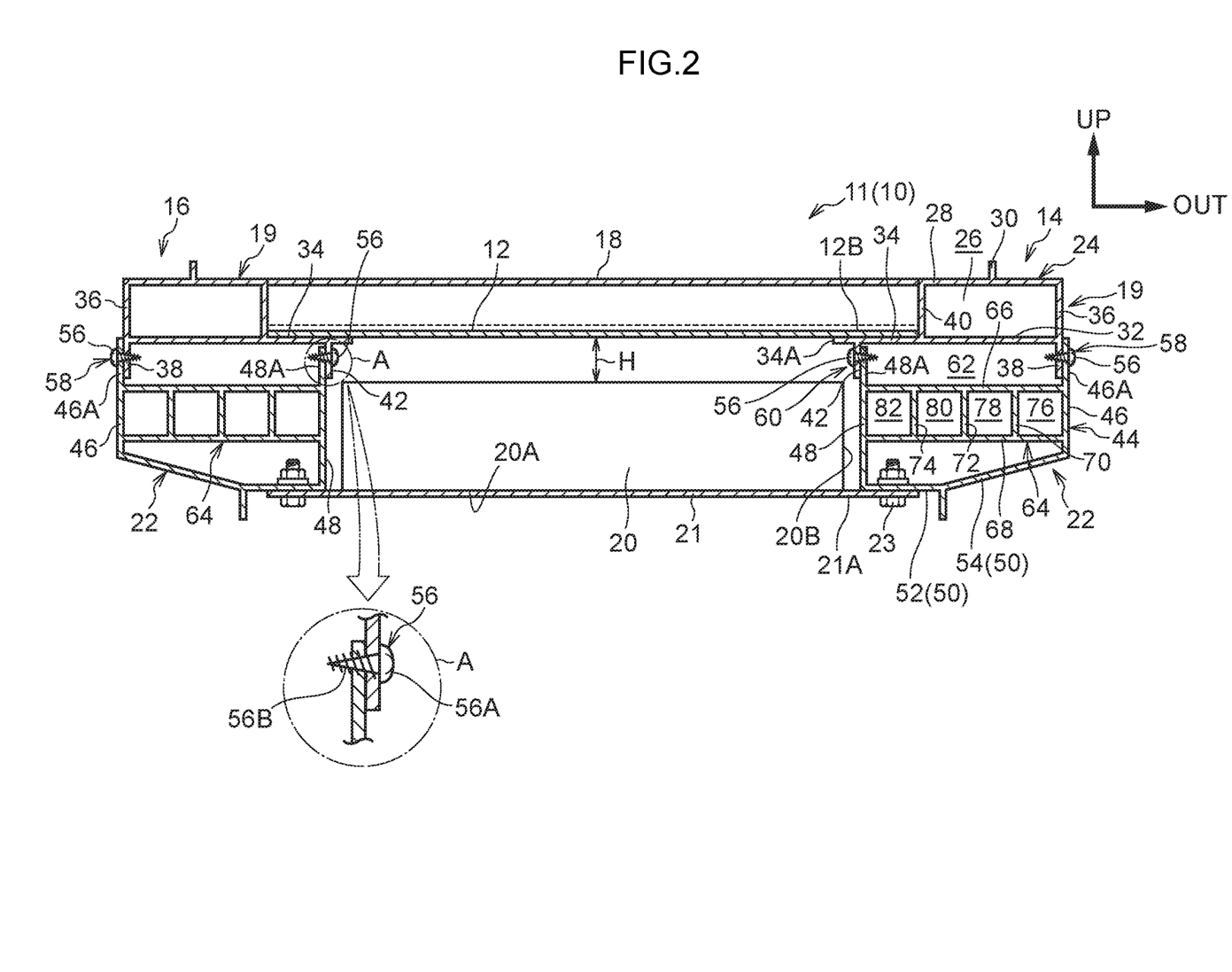
FIG. 2 is a cross-sectional view cut along line 2-2 of FIG. 1.

First, the structure of the vehicle side portion structure relating to the present embodiment is described. A plan view of a vehicle lower portion 11 of a vehicle 10, to which the vehicle side portion structure relating to the present embodiment is applied, is shown in FIG. 1. A cross-sectional view that is cut along line 2-2 of FIG. 1 is shown in FIG. 2.

(Floor Panel)

As shown in FIG. 1, a floor panel 12 extends along the vehicle transverse direction and the vehicle longitudinal direction at the vehicle lower portion 11. Bead portions 12A project-out discontinuously along the vehicle longitudinal direction at the floor panel 12, and the plural bead portions 12A are lined-up along the vehicle transverse direction. The rigidity of the floor panel 12 itself is improved due to the formation of these bead portions 12A.

A rocker (first rocker) 14 and a rocker (second rocker) 16 extend along the vehicle longitudinal direction at the vehicle transverse direction both ends of the floor panel 12, respectively. Floor cross members (hereinafter simply called "cross members") 18 span along the vehicle transverse direction between the rocker 14 and the rocker 16 on the floor panel 12. When the floor cross members 18 are cut along the vehicle vertical direction and the vehicle longitudinal direction, they are shaped as hats whose floor panel 12 sides are open. The floor cross members 18 are disposed between the bead portions 12A and the bead portions 12A that are disposed along the vehicle longitudinal direction.

(Battery Pack)

As shown in FIG. 2, the battery pack (battery) 20, which serves as a driving force supplying device for supplying electric power to the power unit such as a motor or the like, is disposed at the lower side of the floor panel 12, between the rocker 14 and the rocker 16.

The battery pack 20 is structured by, for example, a storage battery that uses lithium ion batteries, nickel-hydrogen batteries or the like, or by a fuel cell that uses methanol or ethanol in addition to hydrogen. The battery pack 20 is formed in the shape of a box that is flat in the vehicle vertical direction and whose length direction runs along the vehicle longitudinal direction.

A tray 21, which is formed in a substantially rectangular shape and supports the battery pack 20 from the lower side, is provided at the lower side of the battery pack 20. Concretely, the tray 21 is formed by a plate member, which is made of a light metal such as an aluminum alloy or the like for example, being press-molded. A bottom wall 20A of the battery pack 20 is fixed onto the tray 21 by fixing such as welding, fastening by rivets, or the like.

The tray 21 is formed to be a size such that it sticks-out from a peripheral wall 20B of the battery pack 20 as seen in a plan view. A joining flange 21A, which projects-out toward the rocker 14 side, is provided at the outer edge portion of the tray 21. This joining flange 21A is joined to the left and right rockers 14, 16 via fasteners 23 such as bolts or the like for example.

(Rockers)

The rockers 14, 16 are described hereinafter. Note that, because the rocker 16 is structured substantially the same as the rocker 14, description of the rocker 16 is omitted.

As shown in FIG. 2, in the present embodiment, the rocker 14 is structured to include a rocker upper 19 that structures the upper portion side of the rocker 14, and a rocker lower 22 that structures the lower portion side of the rocker 14. The rocker upper 19 and the rocker lower 22 are respectively formed of a metal such as an aluminum alloy or the like for example, by extrusion or drawing or the like.

The rocker upper 19 is described first.

The rocker upper 19 has a main body portion 24 that, as seen in a front view, is shaped as a rectangle whose length direction is the vehicle transverse direction. A closed cross-sectional portion 26 is provided at the interior of the main body portion 24. A flange portion 30 that extends out toward the upper side is formed from the vehicle transverse direction central portion of an upper wall portion 28 of the main body portion 24. The lower end portion of an unillustrated pillar is joined to this flange portion 30. Further, a seating wall portion 34, which extends-out toward the vehicle transverse direction inner side past an inner side wall portion 40 that is positioned at the vehicle transverse direction inner side of the main body portion 24, is formed from a lower wall portion 32 of the main body portion 24. A vehicle transverse direction end portion 12B of the floor panel 12 is joined to the seating wall portion 34.

A joining piece (upper side outer side wall) 38 that extends out toward the lower side is formed from an outer side wall portion 36 that is positioned at the vehicle transverse direction outer side of the main body portion 24. An upper end portion 46A of an outer side wall portion 46 of the rocker lower 22 that is described later is joined (joined portion 58) to this joining piece 38 via a joining member (movement permitting portion) 56 of FDS (Flow Drill Screw) or the like.

Moreover, a joining piece (upper side inner side wall) 42 that hangs-down from the seating wall portion 34 is formed between a distal end 34A of the seating wall portion 34 and the inner side wall portion 40 of the main body portion 24. An upper end portion 48A of an inner side wall portion 48 of the rocker lower 22 that is described later is joined (joined portion 60) to this joining piece 42 via the joining member 56.

Figure 3:
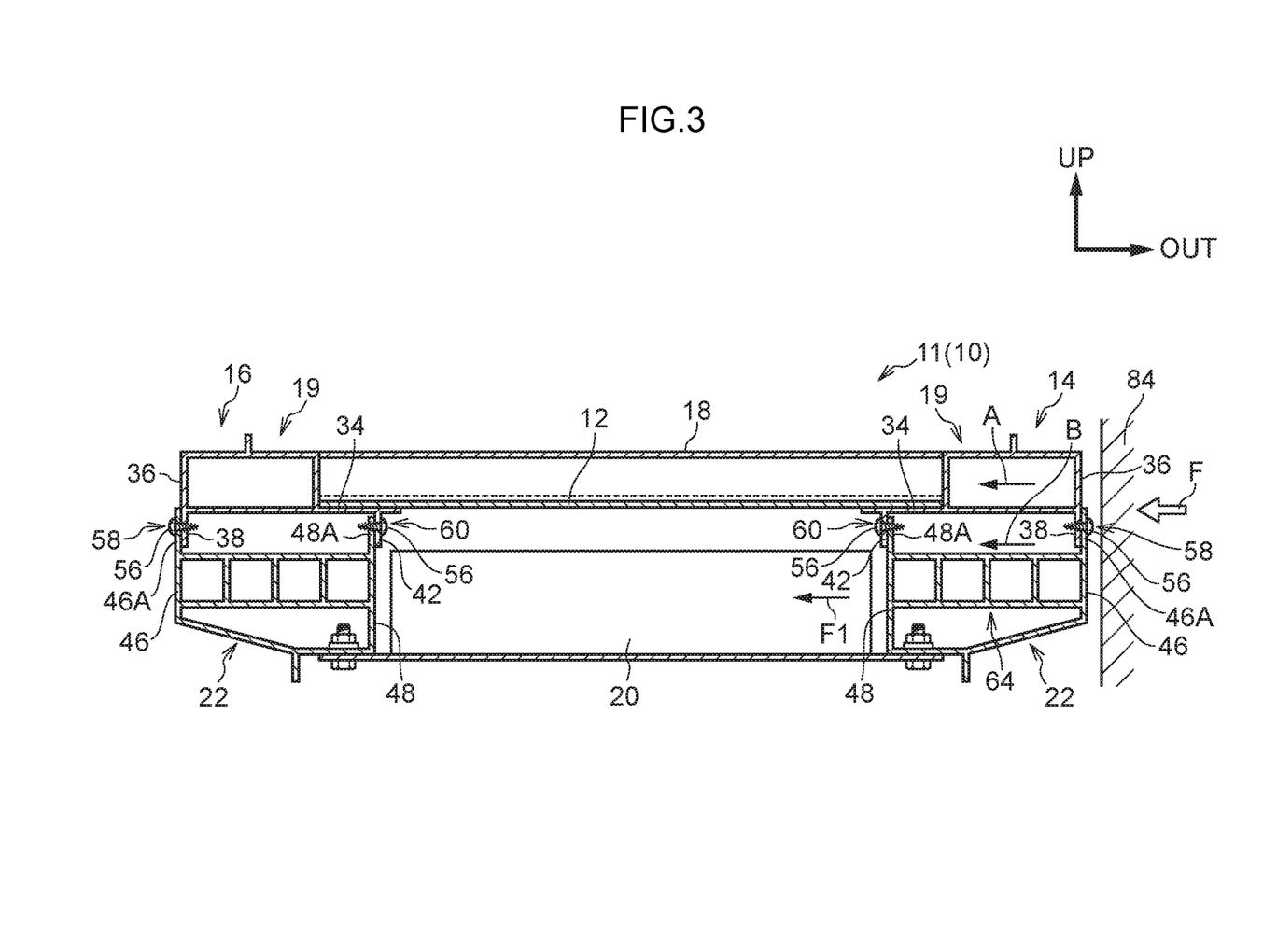
FIG. 3 is a cross-sectional view that corresponds to FIG. 2 and shows a state immediately before collision load is inputted to a rocker of a vehicle to which the vehicle side portion structure relating to the present embodiment is applied.

By the way, the closed cross-sectional portion 26 of the main body portion 24 is disposed at a position overlapping the floor cross member 18 as seen in a vehicle side view. As shown in FIG. 3, at the time of a side collision of the vehicle 10, a portion of collision load (hereinafter called "side collision load") F that is inputted to the rocker 14 is transmitted via the rocker upper 19 to the floor cross member 18 side (transmission path A).

Figure 4:
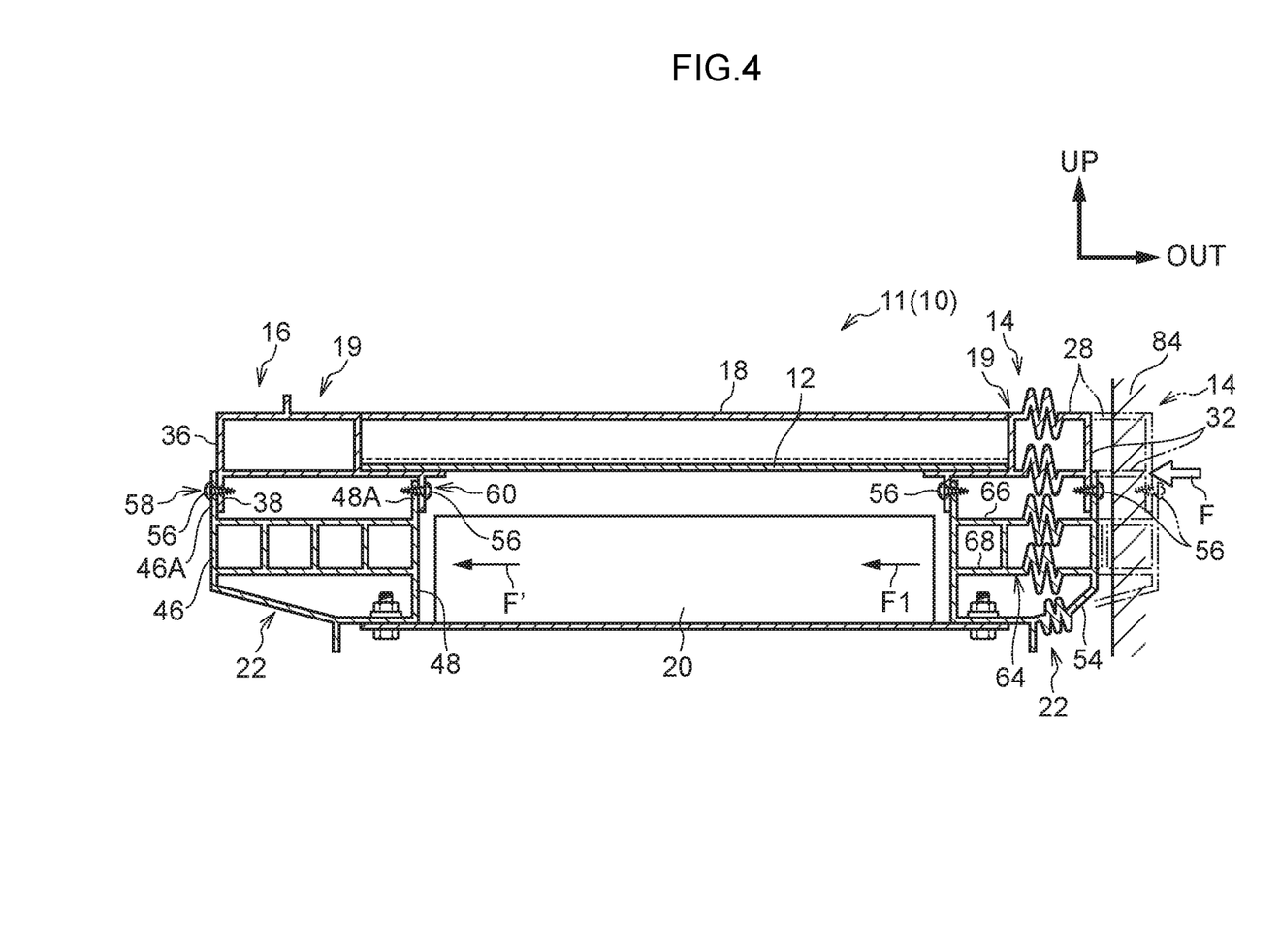
FIG. 4 is a cross-sectional view that shows a state after FIG. 3 in time, which is a state in which collision load has been inputted to the rocker of the vehicle to which the vehicle side portion structure relating to the present embodiment is applied.
Figure 5:
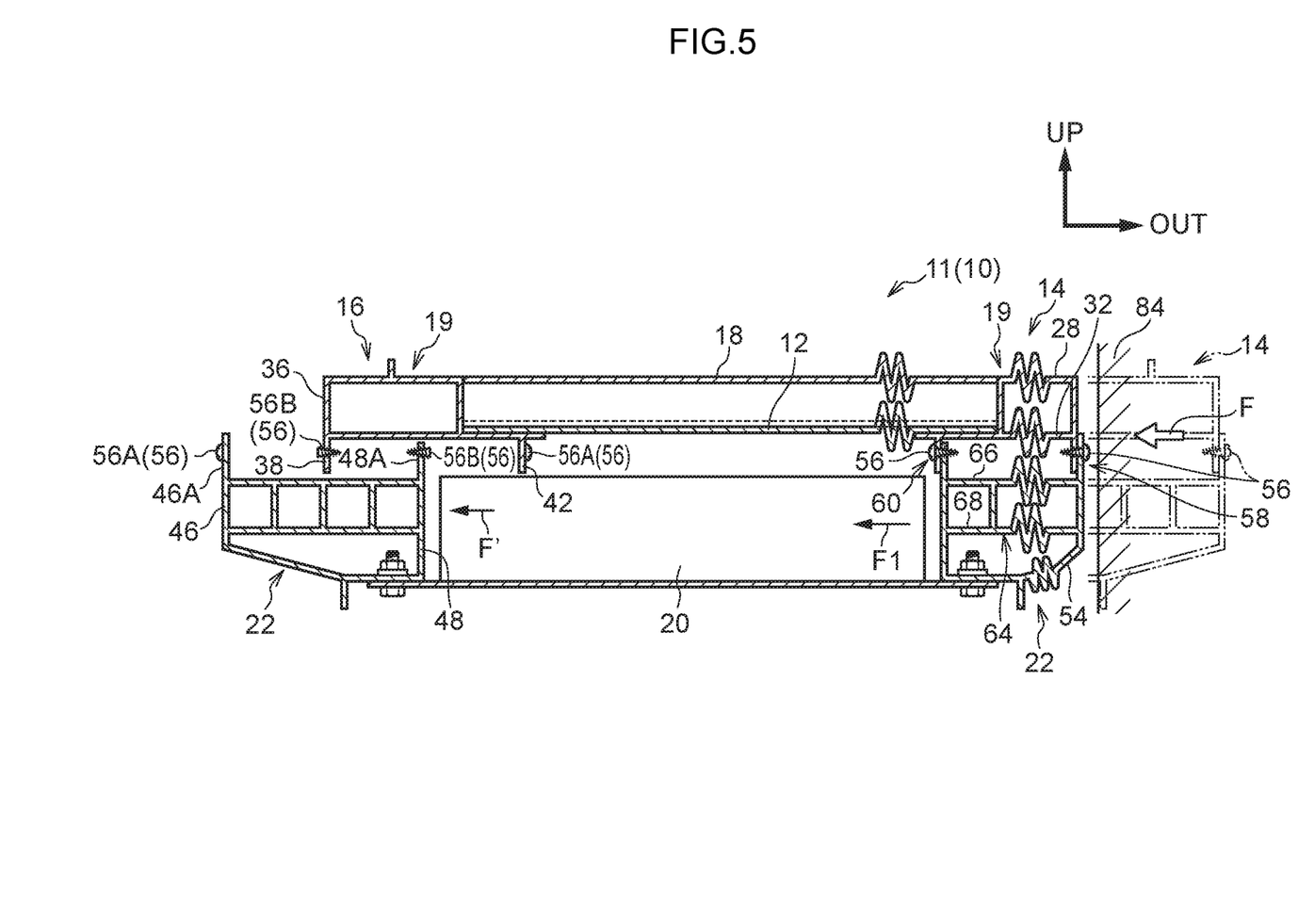
FIG. 5 is a cross-sectional view that shows a state after FIG. 4 in time, which is a state in which collision load has been inputted to the rocker of the vehicle to which the vehicle side portion structure relating to the present embodiment is applied.

Further, when a portion of the side collision load F is inputted to the floor cross member 18, reaction force is obtained, through that floor cross member 18, from the rocker 16 that is at the side opposite the rocker 14 to which the side collision load F is inputted. Due thereto, as shown in FIG. 4, the rocker upper 19 plastically deforms, and impact energy is absorbed. Note that FIG. 3 through FIG. 5 are cross-sectional views showing, over time, the states of the rocker 14 and the like from immediately before the vehicle 10 side-collides until after the side collision. In FIG.

5, the floor cross member 18 and the floor panel 12 are plastically deformed, and the impact energy is absorbed by these as well.

The rocker lower 22 is described next.

As shown in FIG. 2, the rocker lower 22 has a main body portion 44 that, as seen in a front view, is substantially U-shaped and opens toward the upper side and whose length direction is the vehicle transverse direction. This main body portion 44 is structured to include the outer side wall portion (lower side outer side wall) 46 that is positioned at the vehicle transverse direction outer side, the inner side wall portion (lower side inner side wall) 48 that is positioned at the vehicle transverse direction inner side, and a lower wall portion 50 that is positioned at the lower side.

Note that the outer side wall portion 46 is formed to be shorter than the inner side wall portion 48, and the lower end of the outer side wall portion 46 is positioned further toward the upper side than the lower end of the inner side wall portion 48. Therefore, the lower wall portion 50 is structured to include a horizontal lower wall portion 52, which extends substantially along the horizontal direction (the vehicle transverse direction) from the lower end of the inner side wall portion 48 toward the vehicle transverse direction outer side, and an inclined lower wall portion 54, which is inclined from the lower end of the outer side wall portion 46 toward the lower side while heading toward the vehicle transverse direction inner side. Further, the above-described fastener 23 can be inserted-through the horizontal lower wall portion 52. The joining flange 21A, which is formed at the tray 21 that supports the battery pack 20, is fixed to the horizontal lower wall portion 52 of the rocker lower 22 via this fastener 23.

Here, as described above, the joining piece 38 of the outer side wall portion 36 of the rocker upper 19 is joined (the joined portion 58), via the joining member 56, to the upper end portion 46A of the outer side wall portion 46 of the main body portion 44 of the rocker lower 22. Further, the joining piece 42 of the seating wall portion 34 of the rocker upper 19 is joined (the joined portion 60), via the joining member 56, to the upper end portion 48A of the inner side wall portion 48 of the main body portion 44. In this way, in the state in which the rocker lower 22 is joined to the rocker upper 19 via the joining members 56, a closed cross-sectional portion 62 is formed at the interior of the main body portion 44 of the rocker lower 22 between the main body portion 44, and the lower wall portion 32 and the seating wall portion 34 of the main body portion 24 of the rocker upper 19.

A ladder-shaped impact absorbing portion 64 spans substantially along the horizontal direction between the outer side wall portion 46 and the inner side wall portion 48, within the closed cross-sectional portion 62 at a position overlapping the battery pack 20 as seen in a vehicle side view. Therefore, as shown in FIG. 3, at the time of a side collision of the vehicle 10, another portion of the side collision load F that is inputted to the rocker 14 is transmitted via the rocker lower 22 toward the battery pack 20 side (transmission path B).

On the other hand, as shown in FIG. 2, the impact absorbing portion 64 is structured to include an upper wall 66, which spans substantially along the horizontal direction at the vertical direction substantially central portion of the inner side wall portion 48 of the rocker lower 22, and a lower wall 68, which is disposed at the lower side of the upper wall 66 and is formed so as to face the upper wall 66.

Plural (here, 3) connecting walls 70, 72, 74 span along the vertical direction between the upper wall 66 and the lower wall 68. These connecting walls 70, 72, 74 are disposed substantially uniformly along the vehicle transverse direction. Plural closed cross-sectional portions (small spaces 76, 78, 80, 82) are formed at the impact absorbing portion 64 by the connecting walls 70, 72, 74, including the outer side wall portion 46 and the inner side wall portion 48.

The joined portions 58, 60 are described here.

At the joined portion 58, the upper end portion 46A of the outer side wall portion 46 of the rocker lower 22 is disposed further toward the vehicle transverse direction outer side than the joining piece 38 of the outer side wall portion 36 of the rocker upper 19. Further, at the joined portion 60, the upper end portion 48A of the inner side wall portion 48 of the rocker lower 22 is disposed further toward the vehicle transverse direction outer side than the joining piece 42 of the seating wall portion 34 of the rocker upper 19.

Further, the joining members 56 are respectively used at the joined portions 58, 60. The joining members 56 are formed from a metal such as an aluminum alloy or the like for example, and are each structured to include a head portion 56A and a leg portion 56B. When tensile load that is a predetermined load or more (e.g., around 20 kN or more) is applied to the joining member 56, the head portion 56A and the leg portion 56B are severed (broken).

Note that it suffices for the head portion 56A and the leg portion 56B to be severed when load that is a predetermined load or more is applied to the joining member 56. Therefore, the load that is applied to the joining member 56 is not limited to tensile load. For example, in a case in which the joining member 56 is disposed along the vertical direction, shearing load is applied to the joining member 56.

(Operation and Effects of Vehicle Side Portion Structure)

Operation and effects of the vehicle side portion structure relating to the present embodiment are described next.

In the present embodiment, as shown in FIG. 3, when the side collision load F is inputted to the rocker 14 at the time of a side collision of the vehicle 10, a portion (F1) of the side collision load is transmitted to the battery pack 20 and the rocker 16. At this time, the rocker 14 obtains reaction force from the battery pack 20 and the like, and, as shown in FIG. 4, the upper wall portion 28 and the lower wall portion 32 of the rocker upper 19, and the upper wall 66 and the lower wall 68 of the impact absorbing portion 64, and the inclined lower wall portion 54, and the like of the rocker lower 22, respectively plastically deform, and collision energy is absorbed.

On the other hand, at the rocker 16 side, when side collision load F', which is greater than or equal to a set load that is set in advance, is inputted to the rocker 16, the joining members 56 extend (plastically deform), and the rocker lower 22 moves slightly toward the vehicle outer side with respect to the rocker upper 19. At this time, accompanying the movement of the rocker lower 22, the battery pack 20 moves slightly toward the vehicle outer side along the direction of input of the side collision load F.

Further, as shown in FIG. 5, when these joining members 56 break (when load that is greater than the side collision load F' is inputted to the joining members 56), the joined state of the rocker upper 19 and the rocker lower 22 is cancelled, and the rocker upper 19 and the rocker lower 22 separate. Due thereto, the battery pack 20 comes apart toward the lower side via the rocker lower 22. At this time, the floor cross member 18 and the floor panel 12 plastically deform, and the collision energy is further absorbed in a state in which the stroke at the side collision side is ensured.

In the present embodiment, as shown in FIG. 3 through FIG. 5, the joining members 56 are provided that, when the side collision load F' that is greater than or equal to the set load that is set in advance is inputted to the rocker 16 at the time of a side collision of the vehicle 10, permit movement of the rocker lower 22 toward the vehicle outer side at least along the direction of input of the side collision load F (the direction of the arrow).

For example, as shown in FIG. 3, when the side collision load F is inputted to the rocker 14 at the time of a side collision of the vehicle 10, a portion (F1) of the side collision load F is transmitted to the battery pack 20 and the rocker 16. Therefore, in the present embodiment, at the time of a side collision of the vehicle 10, when the side collision load F' that is greater than or equal to the set load is inputted to the rocker 16 such as in the case of a side collision with a collision object 84 such as a pole, or the like, the rocker lower 22 moves toward the vehicle outer side at least along the direction of input of the side collision load F, due to the joining members 56.

Namely, in a case in which the side collision load F' that is greater than or equal to the set load is transmitted from the battery pack 20 to the rocker 16, the rocker lower 22 moves toward the vehicle outer side. Therefore, the reaction force that the battery pack 20 receives from the rocker 16 decreases, and the collision load that is inputted to the battery pack 20 side decreases. Due thereto, in the present embodiment, the battery pack 20 can be protected even in the case of a side collision with a collision object 84 such as a pole or the like.

Further, in the present embodiment, the joining members 56 are provided further toward the upper side than the battery pack 20 as seen in a vehicle side view. For example, as a comparative example, in a case in which the joining members 56 are provided at positions overlapping the battery pack 20 as seen in a vehicle side view, the joining members 56 are respectively provided between the rockers 14, 16 and the battery pack 20 along the vehicle transverse direction. Therefore, the width dimension, along the vehicle transverse direction, at the battery pack 20 becomes shorter by an amount corresponding to the provision of these joining members 56. Namely, the volume of the battery pack 20 becomes smaller by that much. Similarly, in a case in which the joining members 56 are provided at the lower side of the battery pack 20 as seen in a vehicle side view, the height dimension, along the vehicle vertical direction, at the battery pack 20 becomes shorter by that much.

Accordingly, in the present embodiment, as described above, the joining members 56 are provided further toward the upper side than the battery pack 20 as seen in a vehicle side view. The floor panel 12 is provided at the upper side of the battery pack 20, and, generally, a gap H (see FIG. 2) for cooling the battery pack 20 is provided between the floor panel 12 and the battery pack 20. By providing the joining members 56 at the upper side of the battery pack 20 by utilizing this gap H, there is no need to make the volume of the battery pack 20 small in order to provide the joining members 56. Accordingly, the volume of the battery pack 20 can be ensured even if the joining members 56 are provided.

In particular, in the present embodiment, the rocker 14 is structured to include the rocker upper 19, which structures the upper portion of the rocker 14, and the rocker lower 22, which structures the lower portion of the rocker 14. Further, as shown in FIG. 5, when the side collision load F' that is greater than or equal to the set load is inputted to the joining members 56 that join the rocker upper 19 and the rocker lower 22, the rocker lower 22 moves toward the vehicle outer side with respect to the rocker upper 19.

Therefore, in a case in which the joining members 56 are provided at a position overlapping the battery pack 20 or at the lower side of the battery pack 20 as seen in a vehicle side view, at the time when the rocker lower 22 moves toward the vehicle outer side, movement of the rocker lower 22 is hindered by the rocker upper 19. In contrast, in the present embodiment, due to the joining members 56 being provided further toward the upper side than the battery pack 20 as seen in a vehicle side view, such a problem can be obviated.

Further, in the present embodiment, the closed cross-sectional portion 62 is provided within the rocker 14, and the impact absorbing portion 64 is disposed within this closed cross-sectional portion 62. The impact absorbing portion 64 spans between the outer side wall portion 46 and the inner side wall portion 48 of the rocker 14, and is set so as to deform due to input of the side collision load F and absorb collision energy. Due thereto, the side collision load that is inputted to the battery pack 20 side is reduced more.

Generally, the rigidity of the battery pack 20 that is installed in the vehicle 10 is set to be high in order to suppress deformation of the battery pack 20 itself. Therefore, due to the impact absorbing portion 64 being disposed at a position overlapping the battery pack 20 as seen in a vehicle side view, a portion of the side collision load F that is inputted to the rocker 14 at the time of a side collision of the vehicle 10 is transmitted to the battery pack 20 side via the impact absorbing portion 64.

As described above, because the rigidity of the battery pack 20 is set to be high, when the collision load F1 is inputted to the battery pack 20, reaction force is obtained from the battery pack 20. Due thereto, the impact absorbing portion 64 plastically deforms, and impact energy is absorbed. Namely, in the present embodiment, the collision load can be reduced even if there is a short stroke, and the collision load that is transmitted to the rocker 16 side (the transmitted load) is reduced more.

Moreover, in the present embodiment, as shown in FIG. 3, the rocker 14 is structured to include the rocker upper 19 that structures the upper portion, and the rocker lower 22 that structures the lower portion. Further, the main body portion 24 is provided at the rocker upper 19 at a position overlapping the floor cross members 18 as seen in a vehicle side view, and the impact absorbing portion 64 is provided at the rocker lower 22 at a position overlapping the battery pack 20 as seen in a vehicle side view.

Due thereto, at the time of a side collision of the vehicle 10, the collision load F that is inputted to the rocker 14 can be dispersed between the transmission path A of being transmitted via the rocker upper 19 to the floor cross member 18 side, and the transmission path B of being transmitted via the rocker lower 22 to the battery pack 20 side. Namely, in the present embodiment, a reduction in the collision load itself that is transmitted to the floor cross member 18 side and the battery pack 20 side is devised.

Further, as shown in FIG. 2, in the present embodiment, at the joined portions 58, 60 where the rocker upper 19 and the rocker lower 22 are joined together, the upper end portion 46A of the outer side wall portion 46 of the rocker lower 22 is disposed at the vehicle transverse direction outer side of the joining piece 38 of the outer side wall portion 36 of the rocker upper 19. Further, the upper end portion 48A of the inner side wall portion 48 of the rocker lower 22 is disposed at the vehicle transverse direction outer side of the joining piece 42 of the seating wall portion 34 of the rocker upper 19.

As shown in FIG. 3 through FIG. 5, at the time of a side collision of the vehicle 10, when the side collision load F is inputted to the rocker 14, at the rocker 14, this side collision load F is transmitted from the upper end portion 46A of the outer side wall portion 46 of the rocker lower 22 to the joining piece 38 of the outer side wall portion 36 of the rocker upper 19, and this side collision load F is transmitted from the upper end portion 48A of the inner side wall portion 48 of the rocker lower 22 to the joining piece 42 of the seating wall portion 34 of the rocker upper 19. Strictly speaking, at the rocker 14, the side collision load F is gradually damped from the outer side toward the inner side in the vehicle transverse direction.

Further, when the side collision load F1 is transmitted from the rocker 14 to the battery pack 20 and the rocker 16, at the rocker 16 side, this side collision load F1 is transmitted from the joining piece 42 of the seating wall portion 34 of the rocker upper 19 to the upper end portion 48A of the inner side wall portion 48 of the rocker lower 22, and this side collision load F1 is transmitted from the joining piece 38 of the outer side wall portion 36 of the rocker upper 19 to the upper end portion 46A of the outer side wall portion 46 of the rocker lower 22.

For example, as a comparative example, a case is considered in which, at the rocker 16 side, the upper end portion 48A of the inner side wall portion 48 of the rocker lower 22 is disposed at the vehicle transverse direction inner side of the joining piece 42 of the seating wall portion 34 of the rocker upper 19, and the upper end portion 46A of the outer side wall portion 46 of the rocker lower 22 is disposed at the vehicle transverse direction inner side of the joining piece 38 of the outer side wall portion 36 of the rocker upper 19.

In this structure, although not illustrated, the joining piece 42 of the seating wall portion 34 and the joining piece 38 of the outer side wall portion 36 of the rocker upper 19 are disposed at the vehicle outer sides of the upper end portion 48A of the inner side wall portion 48 of the rocker lower 22 and the upper end portion 46A of the outer side wall portion 46 of the rocker lower 22, respectively. Therefore, in a case in which the side collision load F1 is inputted to the rocker 16 and the rocker 16 starts to move along the direction of input of the side collision load F1, the joining piece 42 of the seating wall portion 34 and the joining piece 38 of the outer side wall portion 36 of the rocker upper 19 exist at the destinations of movement of the upper end portion 48A of the inner side wall portion 48 of the rocker lower 22 and the upper end portion 46A of the outer side wall portion 46 of the rocker lower 22, and movement of the rocker lower 22 is impeded by these.

In contrast, in the present embodiment, as shown in FIG. 2, the upper end portion 48A of the inner side wall portion 48 of the rocker lower 22 is disposed at the vehicle transverse direction outer side of the joining piece 42 of the seating wall portion 34 of the rocker upper 19, and the upper end portion 46A of the outer side wall portion 46 of the rocker lower 22 is disposed at the vehicle transverse direction outer side of the joining piece 38 of the outer side wall portion 36 of the rocker upper 19.

In this structure, the joining piece 42 of the seating wall portion 34 and the joining piece 38 of the outer side wall portion 36 of the rocker upper 19 do not exist at the vehicle outer sides of the upper end portion 48A of the inner side wall portion 48 of the rocker lower 22 and the upper end portion 46A of the outer side wall portion 46 of the rocker lower 22. Therefore, at the time of a side collision of the vehicle 10, in a case in which the rocker 16 starts to move along the direction of input of the side collision load F, movement of the rocker lower 22 is not impeded by the joining piece 42 of the seating wall portion 34 and the joining piece 38 of the outer side wall portion 36 of the rocker upper 19.

Other Embodiments

As shown in FIG. 2, in the present embodiment, the rocker 14 is structured to include the rocker upper 19 that structures the upper portion of the rocker 14 and the rocker lower 22 that structures the lower portion of the rocker 14. Further, in the present embodiment, the rocker upper 19 and the rocker lower 22 are joined at the joined portions 58, 60 via the joining members 56 of FDS or the like. However, the present disclosure is not limited to this because it suffices for the rocker upper 19 and the rocker lower 22 to be joined together.

Figure 6:
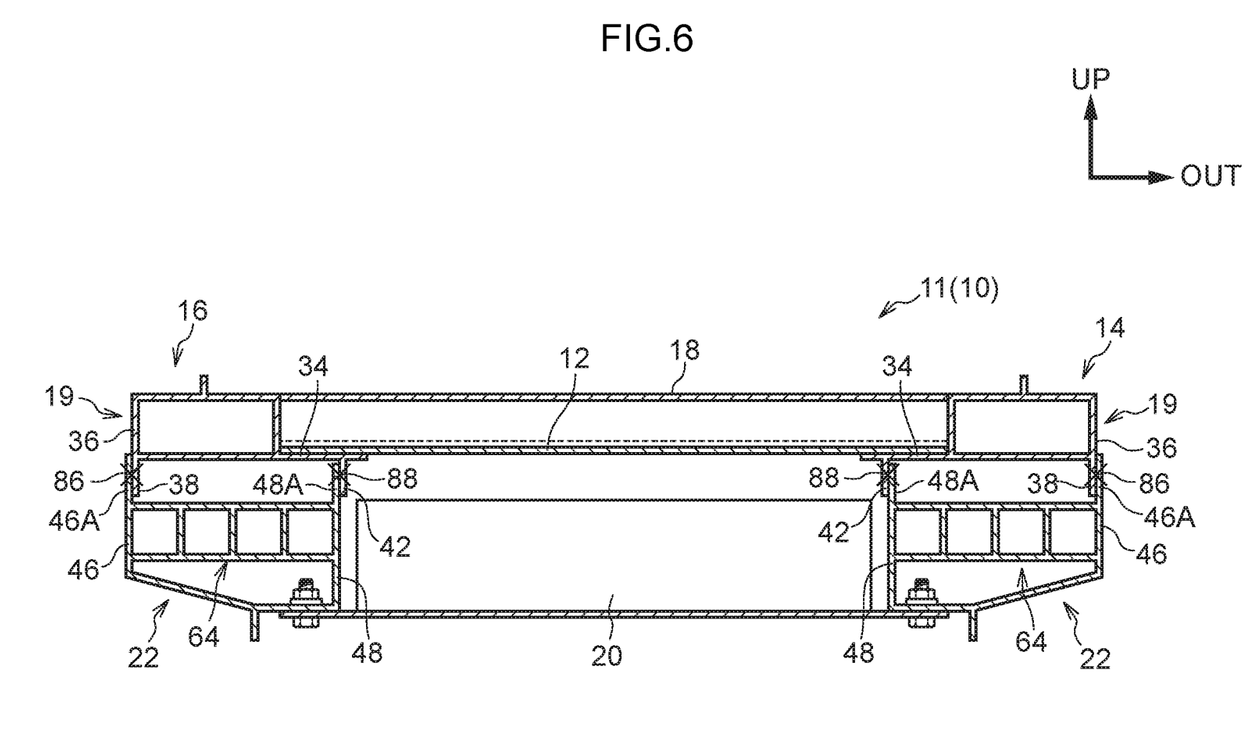
FIG. 6 is a cross-sectional view that corresponds to FIG. 3 and shows modified example 1 of the vehicle side portion structure relating to the present embodiment.

For example, as modified example 1, as shown in FIG. 6, by welding such as spot welding or the like, the upper end portion 46A of the outer side wall portion 46 of the main body portion 44 of the rocker lower 22 and the joining piece 38 of the outer side wall portion 36 of the rocker upper 19 may be connected together (connected portion 86), and the upper end portion 48A of the inner side wall portion 48 of the main body portion 44 of the rocker lower 22 and the joining piece 42 of the seating wall portion 34 of the rocker upper 19 may be connected together (connected portion 88). In this case, in a case in which the rocker 16 starts to move along the direction of input of the side collision load F at the time of a side collision of the vehicle 10, shearing load is applied to the connected portions 86, 88, and the connected portions 86, 88 break due thereto.

Moreover, although the joining members 56 of FDS or the like are used as the movement permitting portions in the present embodiment, the present disclosure is not limited to this. Namely, although not illustrated, the present disclosure is not limited to cases of using, as the movement permitting portions, separate members for permitting movement of the rocker lowers 22, and the rocker lowers 22 can be set so as to be movable due to the provision of weak portions or the like at the rockers 14, 16 themselves.

Further, in the present embodiment, the rocker uppers 19 and the rocker lowers 22 that are shown in FIG. 2 are respectively formed of a metal such as aluminum alloy or the like by extrusion or drawing or the like, but the present disclosure is not limited to this.

Figure 7:
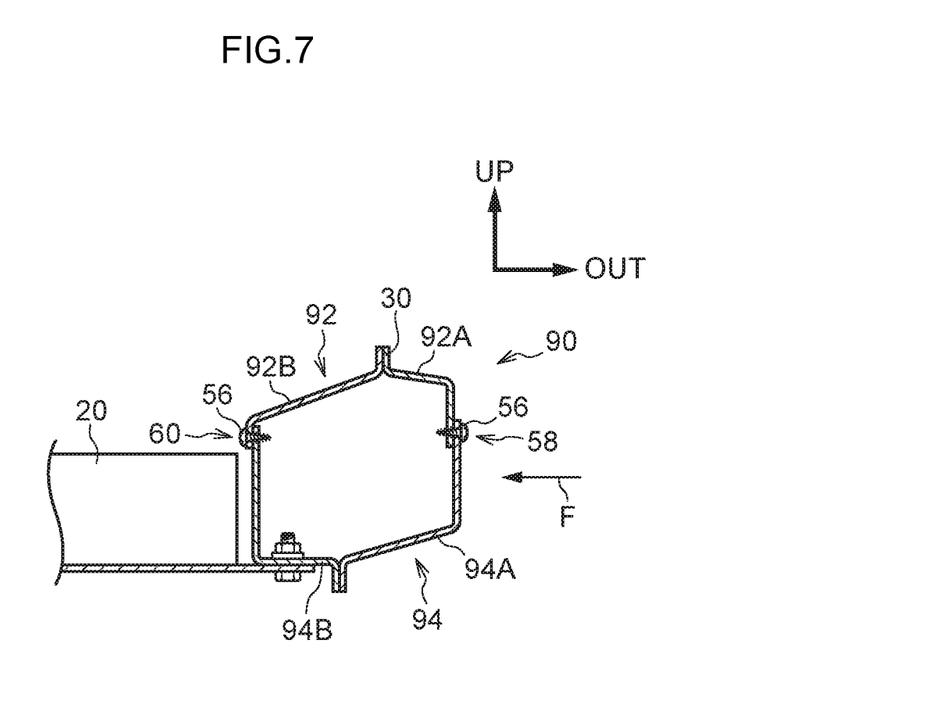
FIG. 7 is an enlarged sectional view of main portions that shows, in an enlarged manner, main portions of modified example 2 of the vehicle side portion structure relating to the present embodiment.

For example, as modified example 2, as shown in FIG. 7, a rocker upper 92 and a rocker lower 94 that structure a rocker 90 may be formed from steel plates. Note that, in this case, in order to form the flange portion 30 for the joining of the lower end portion of the pillar, the rocker upper 92 is structured by an outer portion 92A, which structures the vehicle transverse direction outer side at the rocker 90, and an inner portion 92B, which structures the vehicle transverse direction inner side at the rocker 90. Further, in the same way as the rocker upper 92, the rocker lower 94 also is structured by an outer portion 94A and an inner portion 94B.

Further, in modified example 2, the impact absorbing portion 64 (see FIG. 2) is not formed within the rocker 90. In this case, it is, as much as possible, made such that, when the side collision load F is inputted to the rocker 14 at the time of a side collision of the vehicle 10, some of that side collision load F is not transmitted to the rocker lower 94 side. Namely, in the present embodiment, the bearing of the load at the time of a side collision is carried out at the rocker upper 92 side. Note that, other than this as well, at the rocker 90, the ratio of the bearing of the load can be set freely.

Further, in the present embodiment, the joining members 56 of FDS or the like are used as the movement permitting portions. However, the present disclosure is not limited to this because it suffices to be able to move the rocker lowers 22 with respect to the rocker uppers 19.

Figure 8:
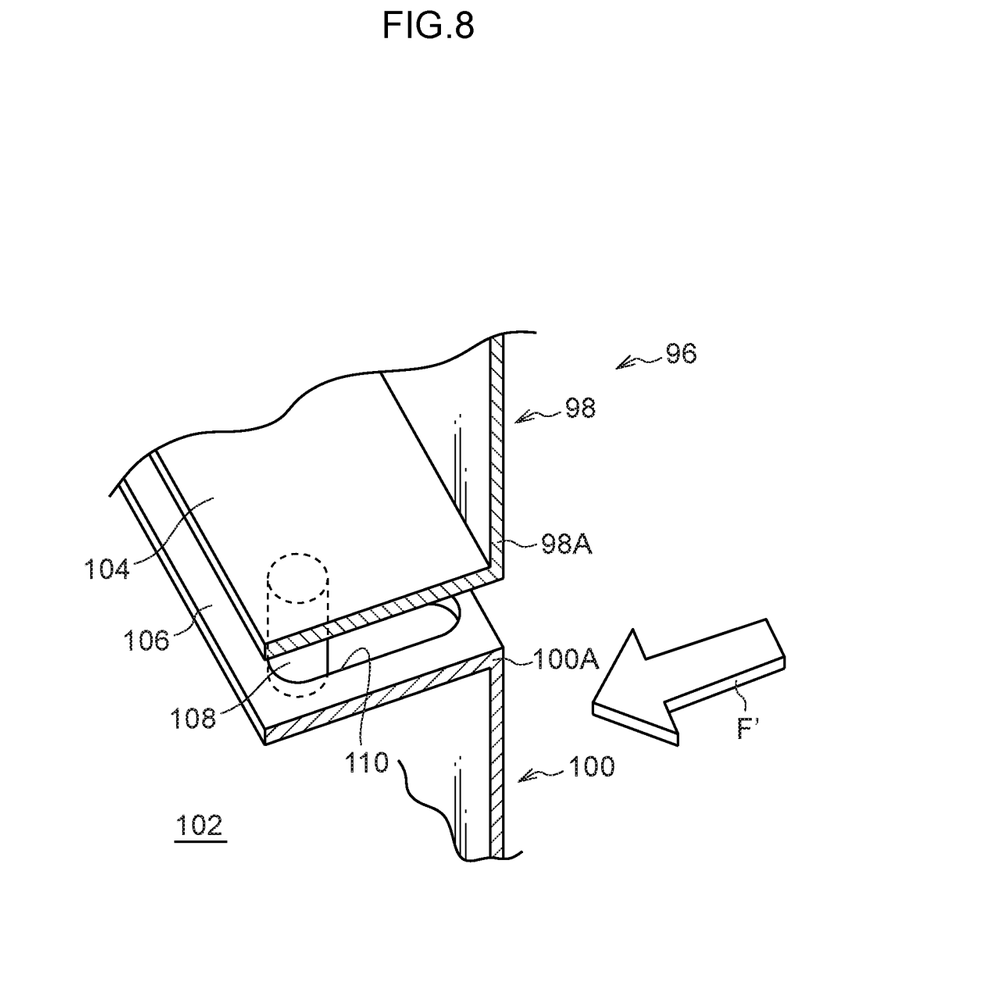
FIG. 8 is an enlarged exploded perspective view of main portions that shows, in an enlarged manner, main portions of modified example 3 of the vehicle side portion structure relating to the present embodiment.

For example, as modified example 3, as shown in FIG. 8, flange portions 104, 106, which project-out substantially horizontally toward a closed cross-sectional portion 102 side that is structured by a rocker upper 98 and a rocker lower 100, are respectively provided at a lower end portion 98A of the rocker upper 98 and an upper end portion 100A of the rocker lower 100 that structure a rocker 96. The flange portions 104, 106 are disposed so as to face one another in the vertical direction. Further, a pin (engaging portion) 108, which is disposed along the vertical direction, is provided at the flange portion 104 that is at the rocker upper 98 side, and a long hole (engaged-with portion) 110, into which this pin 108 can be inserted and that is formed along the vehicle transverse direction, is provided in the flange portion 106 that is at the rocker lower 100 side.

In this structure, the pin 109 is disposed at the vehicle transverse direction inner side of the long hole 110. When, in this state, the side collision load F' is inputted to the rocker 96, the rocker lower 100 can move along the vehicle transverse direction via the long hole 110, with the pin 108 that is at the rocker upper 98 side being the reference. Note that, although not illustrated, of course, the long hole may be provided at the rocker upper side and the pin may be provided at the rocker lower side.

Moreover, in the present embodiment, the impact absorbing portion 64 is formed in the shape of a ladder. However, the shape of the impact absorbing portion 64 is not limited to this. The shape of the impact absorbing portion can be changed appropriately in relation to the plate thickness thereof, such as, for example the plate thickness may be made to be thin and the impact absorbing portion may be formed in a honeycomb shape, or the like.

Although an example of an embodiment of the present disclosure has been described above, embodiments of the present disclosure are not limited to the above. The embodiment and the various modified examples may be used by being combined appropriately. The present disclosure can, of course, be implemented in various forms within a scope that does not depart from the gist thereof.

What is claimed is:

1. A vehicle side portion structure comprising:
   a pair of rockers that are respectively disposed at both vehicle transverse direction outer sides of a floor panel of a vehicle, and that extend along a vehicle longitudinal direction;
   a battery that is disposed between the pair of rockers at a vehicle vertical direction lower side of the floor panel, and that supplies electric power to a motor that is installed in the vehicle; and
   movement permitting portions that, when, at a time of a side collision of the vehicle, a collision load that is greater than or equal to a set load that is set in advance is inputted to a second rocker positioned at a side opposite from a first rocker, which is positioned at a side collision side among the pair of rockers, permit movement of the second rocker toward a vehicle outer side at least along a direction of input of the collision load.

2. The vehicle side portion structure of claim 1, wherein the movement permitting portions are provided further toward a vehicle vertical direction upper side than the battery as seen in a vehicle side view.

3. The vehicle side portion structure of claim 1, further comprising:
   closed cross-sectional portions that are provided within the pair of rockers, respectively; and
   impact absorbing portions that are disposed within the closed cross-sectional portions at positions overlapping the battery as seen in a vehicle side view, that span between outer side walls that are provided at vehicle transverse direction outer sides at the rockers and inner side walls that are provided at vehicle transverse direction inner sides at the rockers, and that deform due to input of the collision load and absorb collision energy.

4. The vehicle side portion structure of claim 1, wherein:
   the rockers are structured to include rocker uppers that structure upper portions of the rockers and rocker lowers that structure lower portions of the rockers, and
   the movement permitting portions are joined portions that join the rocker uppers and the rocker lowers, and that break when a collision load that is greater than or equal to the set load is inputted to the movement permitting portions.

5. The vehicle side portion structure of claim 4, wherein the joined portions at which the rocker uppers and the rocker lowers are joined are structured to include:
   upper side outer side walls that are provided at vehicle transverse direction outer sides at the rocker uppers;
   lower side outer side walls that are provided at vehicle transverse direction outer sides at the rocker lowers, and that are disposed at vehicle transverse direction outer sides of the upper side outer side walls;
   upper side inner side walls that are provided at vehicle transverse direction inner sides at the rocker uppers; and
   lower side inner side walls that are provided at vehicle transverse direction inner sides at the rocker lowers, and that are disposed at vehicle transverse direction outer sides of the upper side inner side walls.

6. The vehicle side portion structure of claim 1, wherein:
   the rockers are structured to include rocker uppers that structure upper portions of the rockers and rocker lowers that structure lower portions of the rockers, and
   the movement permitting portions include:
   engaging portions that are provided at the rocker uppers, and
   engaged-with portions that are provided at the rocker lowers, and that are engaged with the engaging portions so as to be able to move relative thereto, the engaging portions moving along a vehicle transverse direction when a collision load that is greater than or equal to the set load is inputted to the movement permitting portions.

* * * * *

UNITED STATES PATENT AND TRADEMARK OFFICE
CERTIFICATE OF CORRECTION

PATENT NO. : 10,974,767 B2
APPLICATION NO. : 16/527765
DATED : April 13, 2021
INVENTOR(S) : Kyosuke Kawase It is certified that error appears in the above-identified patent and that said Letters Patent is hereby corrected as shown below:

In the Specification

In Column 1, Line(s) 24, delete "still" and insert --sill--, therefor.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*